(12) United States Patent
Viksnins et al.

(10) Patent No.: US 6,922,147 B1
(45) Date of Patent: Jul. 26, 2005

(54) WARNING SYSTEM SENSING CHILD LEFT BEHIND IN INFANT SEAT IN VEHICLE

(76) Inventors: Ann S. Viksnins, 2232 High Pointe Ct., Mendota Heights, MN (US) 55120-1914; Suneel Arora, 4150 Minnesota Ln., Plymouth, MN (US) 55446; Joan E. Morse, 4150 Minnesota Ln., Plymouth, MN (US) 55446; Katharine A. Jackson Huebsch, 3505 Sheridan Ave. N., Minneapolis, MN (US) 55412

( * ) Notice: Subject to any disclaimer, the term of this patent is extended or adjusted under 35 U.S.C. 154(b) by 46 days.

(21) Appl. No.: 10/193,791

(22) Filed: Jul. 12, 2002

Related U.S. Application Data
(60) Provisional application No. 60/305,110, filed on Jul. 12, 2001.

(51) Int. Cl.[7] ............................................. G08B 23/00
(52) U.S. Cl. ..................... 340/573.1; 180/272; 340/457; 340/522; 340/667
(58) Field of Search ................................ 340/457, 541, 340/667, 573.1, 539.1, 522; 180/272

(56) References Cited

U.S. PATENT DOCUMENTS

| | | | |
|---|---|---|---|
| 5,482,314 A | 1/1996 | Corrado | |
| 5,600,302 A | 2/1997 | Lewis | |
| 5,605,348 A | 2/1997 | Blackburn | |
| 5,640,145 A | 6/1997 | Newham | |
| 5,793,291 A * | 8/1998 | Thornton | 340/457 |
| 5,802,479 A | 9/1998 | Kithil | |
| 5,821,633 A | 10/1998 | Burke | |
| 5,848,661 A | 12/1998 | Fu | |
| 5,901,978 A | 5/1999 | Breed | |
| 5,949,340 A * | 9/1999 | Rossi | 340/457 |
| 5,971,432 A | 10/1999 | Gagnon | |
| 6,005,958 A | 12/1999 | Farmer | |
| 6,014,602 A | 1/2000 | Kithil | |
| 6,024,378 A | 2/2000 | Fu | |
| 6,026,340 A | 2/2000 | Corrado | |
| 6,029,105 A | 2/2000 | Schweizer | |
| 6,070,115 A | 5/2000 | Oestreicher | |
| 6,104,293 A | 8/2000 | Rossi | |
| 6,126,233 A | 10/2000 | Gaetano | |
| 6,198,998 B1 | 3/2001 | Farmer | |
| 6,223,606 B1 | 5/2001 | Burke | |
| 6,236,333 B1 | 5/2001 | King | |
| 6,243,634 B1 | 6/2001 | Oestreicher | |
| 6,259,167 B1 | 7/2001 | Norton | |
| 6,259,362 B1 * | 7/2001 | Lin | 340/457 |
| 2002/0161501 A1 * | 10/2002 | Dulin et al. | 180/272 |

* cited by examiner

*Primary Examiner*—Thomas Mullen
(74) *Attorney, Agent, or Firm*—Ann S. Viksnins; Suneel Arora; Katharine Jackson Huebsch (57) ABSTRACT

This document discloses various systems and methods for reducing the likelihood of leaving an unattended child behind in an infant/child seat in a vehicle.

23 Claims, 5 Drawing Sheets

WARNING SYSTEM SENSING CHILD LEFT BEHIND IN INFANT SEAT IN VEHICLE

CROSS REFERENCE TO RELATED APPLICATION

This patent application claims the benefit of priority, under 35 U.S.C. Section 119(e), to U.S. Provisional Patent Application Ser. No. 60/305,110, filed Jul. 12, 2001, the disclosure of which is incorporated herein by reference in its entirety.

TECHNICAL FIELD

This document relates generally to a warning system for detecting the presence of an occupant in a vehicle, and particularly, but not by way of limitation, to a warning system for sensing a child left in an infant seat in a vehicle.

BACKGROUND

Bringing home new baby is usually a joyful occasion. The addition of new family member, however, can be stressful on a family as the presence of a new family member changes the family dynamics. Also, with a new baby in the home, parents or caretakers are often seriously sleep deprived due to an infant's irregular feeding and sleeping schedules. A long period of sleep deprivation can have a significant effect on a person's memory. Tragically, every year infants die or are seriously injured to due a driver forgetting that an infant is in the back seat of a car, and leaving the vehicle for a long period of time, such as while they are working. If the weather is either very hot or very cold, the infant can perish prior to anyone becoming aware of the dangerous situation. According to one report, from the years 1996 to 2000 in the United States, more than 120 children died from heatstroke in a vehicle (although not all of these children were infants left behind in carseats; some were children that climbed into parked cars but then couldn't get out on their own).

A system for detecting whether a child car seat harness is locked is discussed in U.S. Pat. No. 5,581,234 to Emery et al., entitled INFANT VEHICLE SEAT ALARM SYSTEM, which is incorporated herein by reference in its entirety.

A system for detecting whether a child has been left behind in a school bus is discussed in U.S. Pat. No. 5,243,323 to Rogers, entitled SCHOOL BUS ALARM SYSTEM, which is incorporated herein by reference in its entirety.

A system for preventing children from becoming inadvertently locked within a vehicle is discussed in U.S. Pat. No. 5,793,291 to Thornton, entitled CHILD ALERT SYSTEM FOR AUTOMOBILES, which is incorporated herein by reference in its entirety. The system uses a motion detector to detect the presence of a child or pet within a locked vehicle. While this system provides some advantages, particularly in the case of older children that may inadvertently lock themselves in a vehicle while playing, it fails to protect children who have been left asleep in their child seats and are not capable of sufficient activity to set off a motion detector. Such infants may continue sleeping and may become dehydrated and comatose without ever waking, and therefore, they may not be detected by a motion detector.

A system for preventing children from being left behind in an infant car seat is discussed in U.S. Pat. No. 5,949,340 and U.S. Pat. No. 6,104,293 to Rossi, each entitled WARNING SYSTEM FOR DETECTING PRESENCE OF A CHILD IN AN INFANT CAR SEAT, and each of which is incorporated by reference herein in its entirety. This system generates a warning when an infant is present and the vehicle ignition system has been turned from "on" to "off." Detecting the state of an automotive ignition system, however, may be difficult to implement. Such ignition detection may require complicated electronic components, which may be different for different automobile models. As a result, such a system may be difficult to bundle with an infant car seat, which is often, but not always, purchased separately from the vehicle. Therefore, such a system may not gain the widespread consumer acceptance that is desired to avoid the potential tragedy that may result from leaving a child behind in an infant car seat. The present inventors have recognized, therefore, that there is an unmet need for an improved system for avoiding such tragedy.

SUMMARY

This document discloses various systems and methods for reducing the likelihood of leaving an unattended child behind in an infant/child seat in a vehicle.

A first illustrative example includes a warning system for detecting a child left in an child car seat in a vehicle. In this example, the system comprises a child car seat, a child occupant sensor, a temperature sensor, and an alarm. The child occupant sensor includes an input to detect a child in the child car seat, and an output providing a signal representative of whether a child is present in the child car seat. The temperature sensor includes an input to detect an ambient vehicle temperature, and an output to provide a signal responsive to the ambient vehicle temperature. The alarm is coupled to the child occupant sensor output and the temperature sensor output. The alarm is configured to provide a warning using information about whether the child is present in the child car seat and the ambient vehicle temperature is outside an acceptable range.

The system of first example may include other variations. In one embodiment, the system may include a comparator circuit and a control circuit. The comparator circuit is coupled to the output of the temperature sensor. The comparator circuit includes at least one of high and low temperature thresholds. The comparator includes an output to provide a signal indicating whether the ambient vehicle temperature is outside the acceptable range. The control circuit is coupled to the output of the comparator and the output of the child occupant sensor. The control circuit includes a timer to determine whether the child has been in the seat for a predetermined period of time at a temperature outside the acceptable range, and an output to provide a responsive alarm activation signal. The alarm is coupled to the output of the control circuit to provide an alarm responsive to the alarm activation signal.

In other variations, the alarm is remote from the control circuit and communicatively coupled thereto. The alarm may include a wireless telephony device. The system may include an alarm disabling switch. The alarm may be coupled to at least a portion of a vehicle navigation system. The alarm may include a global positioning system (GPS) device.

In other variations, the alarm is communicatively coupled to a vehicle remote entry device to receive a door-locking signal. The alarm is also coupled to the child occupant sensor. The alarm is configured to provide a warning using information from the child occupant sensor indicating that the child seat is occupied and the door-locking signal indicating that the door is being locked. In a further variation, the alarm includes a signal strength detector configured to detect a distance between a portion of the vehicle and the remote entry device. The alarm is configured to use the distance in providing a responsive warning.

In other variations, the system further comprises a driver occupant sensor. The driver occupant sensor including an input to detect a driver in a driver's seat. The alarm is configured to provide a warning using information about whether the driver is present in the driver's scat.

In other variations, the alarm is configured to actuate at least one of unlocking and opening at least one of a door and a window of the vehicle.

A second illustrative example discloses a warning system for detecting a child left in an child car seat in a vehicle. The system comprises a child car seat, a child occupant sensor, and a remote entry device. The child occupant sensor includes an input to detect a child in the child car seat. The child occupant sensor includes an output providing a signal representative of whether a child is present in the child car seat. A remote entry device is communicatively coupled to the child occupant sensor. The remote entry device is configured to trigger a warning using information about whether the child is present in the child car seat.

In other variations, the remote entry device includes a user input device configured to lock a door of the vehicle. The remote entry device is configured to trigger a warning if the child is present in the child car seat when the user input device is activated to lock the door of the vehicle. In a further embodiment, the remote entry device is configured to trigger a warning using information about whether the child is present in the child car seat and information about a distance between the remote entry device and the vehicle.

In other variations, the system comprises a temperature sensor. The temperature sensor includes an input to detect an ambient vehicle temperature and an output to provide a signal responsive to the ambient vehicle temperature. The alarm is configured to provide a warning using information about whether the child is present in the child car seat and using the ambient vehicle temperature.

In other variations, the alarm is remote from the child car seat and is communicatively coupled thereto. In one embodiment, the alarm includes a wireless telephony device. In another embodiment, the system includes an alarm disabling switch. In another embodiment, the alarm is coupled to at least a portion of a vehicle navigation system. In another embodiment, the alarm includes a global positioning system (GPS) device.

In other variations, the alarm includes a signal strength detector. The signal strength detector is configured to detect a distance between a portion of the vehicle and the remote entry device. The alarm is configured to use the distance in providing a responsive warning.

In other variations, the system further comprises a driver occupant sensor. The driver occupant sensor includes an input to detect a driver in a driver's seat. The alarm is configured to provide a warning using information about whether the driver is present in the driver's seat. In one embodiment, the alarm is configured to actuate at least one of unlocking and opening at least one of a door and a window of the vehicle. (This may, however, be restricted to an excessively hot ambient vehicle temperature; an excessively cold ambient vehicle temperature does not trigger opening a door/window, in one embodiment).

A third illustrative example discloses a warning system for detecting a child left in an child car seat in a vehicle. In this example, the system comprises a child car seat, a child occupant sensor, a driver occupant sensor, and an alarm. The child occupant sensor includes an input to detect a child in the child car seat, and an output providing a signal representative of whether a child is present in the child car seat. The driver occupant sensor includes an input to detect a driver in a driver's seat. The driver occupant sensor includes an output providing a signal representative of whether a driver is present in the driver's seat. The alarm is communicatively coupled to the child occupant sensor and the driver occupant sensor. The alarm is configured to provide a warning using information about whether the child is present in the child car seat and whether the driver is present in the driver's seat. In another variation, the system includes an alarm disabling switch.

A fourth illustrative example discloses a warning system for detecting a child left in an child car seat in a vehicle. The system comprises a child car seat, a child occupant sensor, a driver door sensor, and an alarm. The child occupant sensor includes an input to detect a child in the child car seat, and an output providing a signal representative of whether a child is present in the child car seat. The driver door sensor includes an output providing a signal representative of whether a driver's door is open. The alarm is communicatively coupled to the child occupant sensor and the driver occupant sensor. The alarm is configured to provide a warning using information about whether the child is present in the child car seat and whether the driver's door is open. In another variation, the alarm includes an alarm disabling switch.

A fifth illustrative example discloses a method. In this example, the method includes detecting whether a child is present in a child car seat in a vehicle, detecting an ambient vehicle temperature, and providing an indication of whether a child is present in the child car seat at an ambient temperature outside an predetermined range.

In other variations, the method includes providing an indication of whether a child is present in the child car seat at an ambient temperature outside a predetermined range for a time period that exceeds a predetermined duration. In another embodiment, the method includes wirelessly communicating the indication to a remote location. In another embodiment, the method includes at least one of unlocking and opening at least one of a door and a window of the vehicle using the indication.

A sixth illustrative example includes a method. In this example, the method includes detecting whether a child is present in a child car seat in a vehicle, detecting a locking of a vehicle door, and providing an indication of whether a child is present in the child car seat upon the locking of the vehicle door.

In other variations, the method includes detecting a locking actuated by a remote entry device. In one embodiment, the method includes detecting a distance between the remote entry device and the vehicle, and in which the providing the indication includes also using the distance in determining whether to provide the indication. In another embodiment, the method includes wirelessly communicating the indication to a remote location. In another embodiment, the method includes at least one of unlocking and opening at least one of a door and a window of the vehicle using the indication.

An seventh illustrative example includes a method. In this example, the method includes detecting whether a child is present in a child car seat in a vehicle, detecting whether a driver is present in a driver's seat in the vehicle, and providing an indication of whether a child is present in the child car seat when the driver leaves the driver's seat.

In other variations, the method includes wirelessly communicating the indication to a remote location. In one embodiment, the method includes at least one of unlocking and opening at least one of a door and a window of the vehicle using the indication.

A eighth illustrative example discloses a method. In this example, the method includes detecting whether a child is present in a child car seat in a vehicle, detecting an opening of a driver's door of the vehicle, and providing an indication of whether a child is present in the child car seat when the driver's door is opened.

In other variations, the method includes wirelessly communicating the indication to a remote location. In one embodiment, the method also includes at least one of unlocking and opening at least one of a door and a window of the vehicle using the indication.

Other aspects of the disclosed systems, devices, and methods will become apparent upon reading the following detailed description and viewing the drawings that form a part thereof

BRIEF DESCRIPTION OF THE DRAWINGS

In the drawings, which are offered by way of example, and not by way of limitation, and which are not necessarily drawn to scale, like numerals describe substantially similar components throughout the several views. Like numerals having different letter suffixes represent different instances of substantially similar components.

DETAILED DESCRIPTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that the embodiments may be combined, or that other embodiments may be utilized and that structural, logical and electrical changes may be made without departing from the spirit and scope of the present invention. The following detailed description is, therefore, not to be taken in a limiting sense, and the scope of the present invention is defined by the appended claims and their equivalents. In this document, the terms "a" or "an" are used, as is common in patent documents, to include one or more than one. Furthermore, all publications, patents, and patent documents referred to in this document are incorporated by reference herein in their entirety, as though individually incorporated by reference.

In this document, the terms "transceiver," "transceiving," and "transceiver" refer to transmitting and/or receiving data. That is, these terms include all of structures and methods of: (1) transmitting, but not receiving; (2) receiving, but not transmitting; and, (3) both transmitting and receiving.

Figure 1:
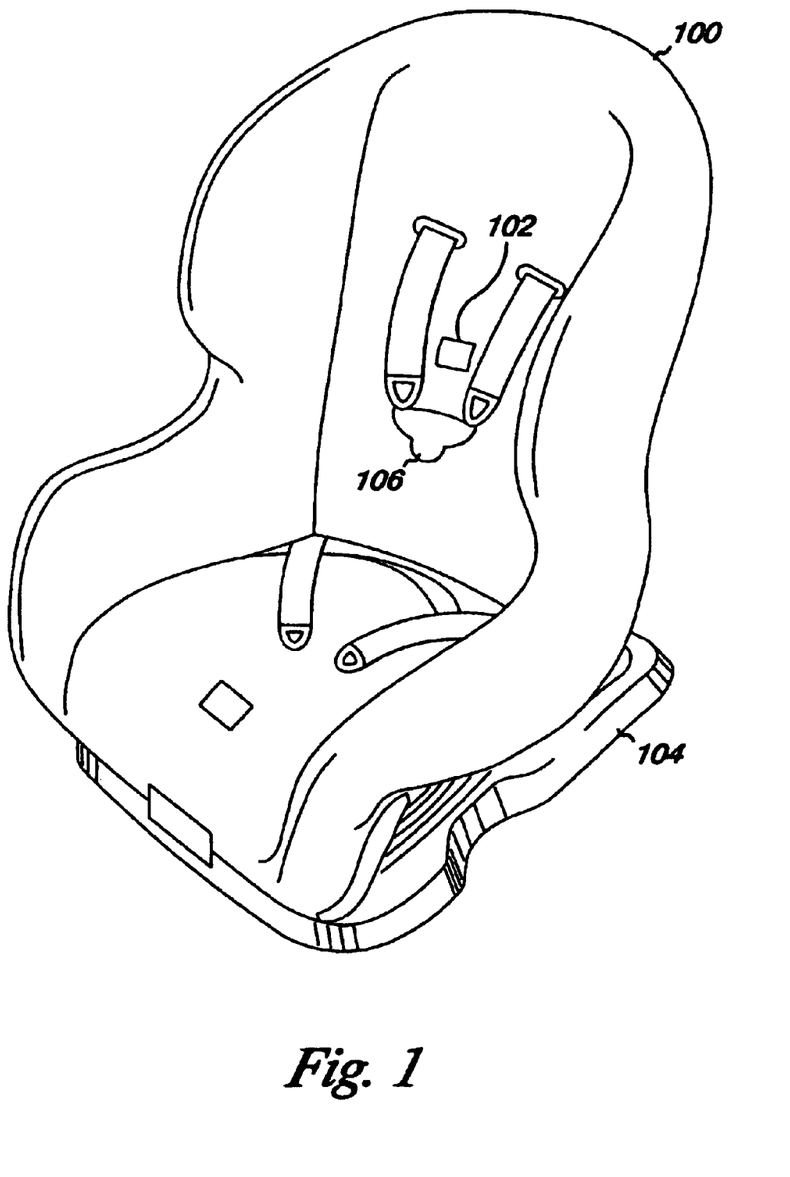
FIG. 1 is a schematic drawing illustrating generally an example of portions of a system sensing a child left behind in an infant seat in a vehicle and a portion of an example environment in which the system is used.

FIG. 1 is a schematic drawing illustrating generally an example of portions of a system sensing a child left behind in an infant seat in a vehicle, and a portion of an example environment in which the system is used. This example illustrates an infant seat 100 and a warning module 102. Warning module 102 is either integrally formed with seat 100, such as to a back and/or base portion of seat 100 or, alternatively, a portion of warning module 102 is located remotely from seat 100 and coupled thereto. In this example, seat 100 includes a base 104 that is attached to a rear seat or other portion of the vehicle, such as using a vehicle seat belt or other fixation technique. Seat 100 is releasably attached to base 104 using known techniques. Alternatively, base 104 need not be included, and seat 100 is fastened to the vehicle without the intermediate base 104. Moreover, seat 100 can be configured either as a forward-facing or rear-facing car seat using known techniques, as an infant seat integrated with the vehicle itself, and/or as a booster seat for an older child. In this example, seat 100 includes a harness and associated belts for securing a child to reduce the risk of injury to the child in the event that the vehicle is in a collision or other accident.

Figure 2:
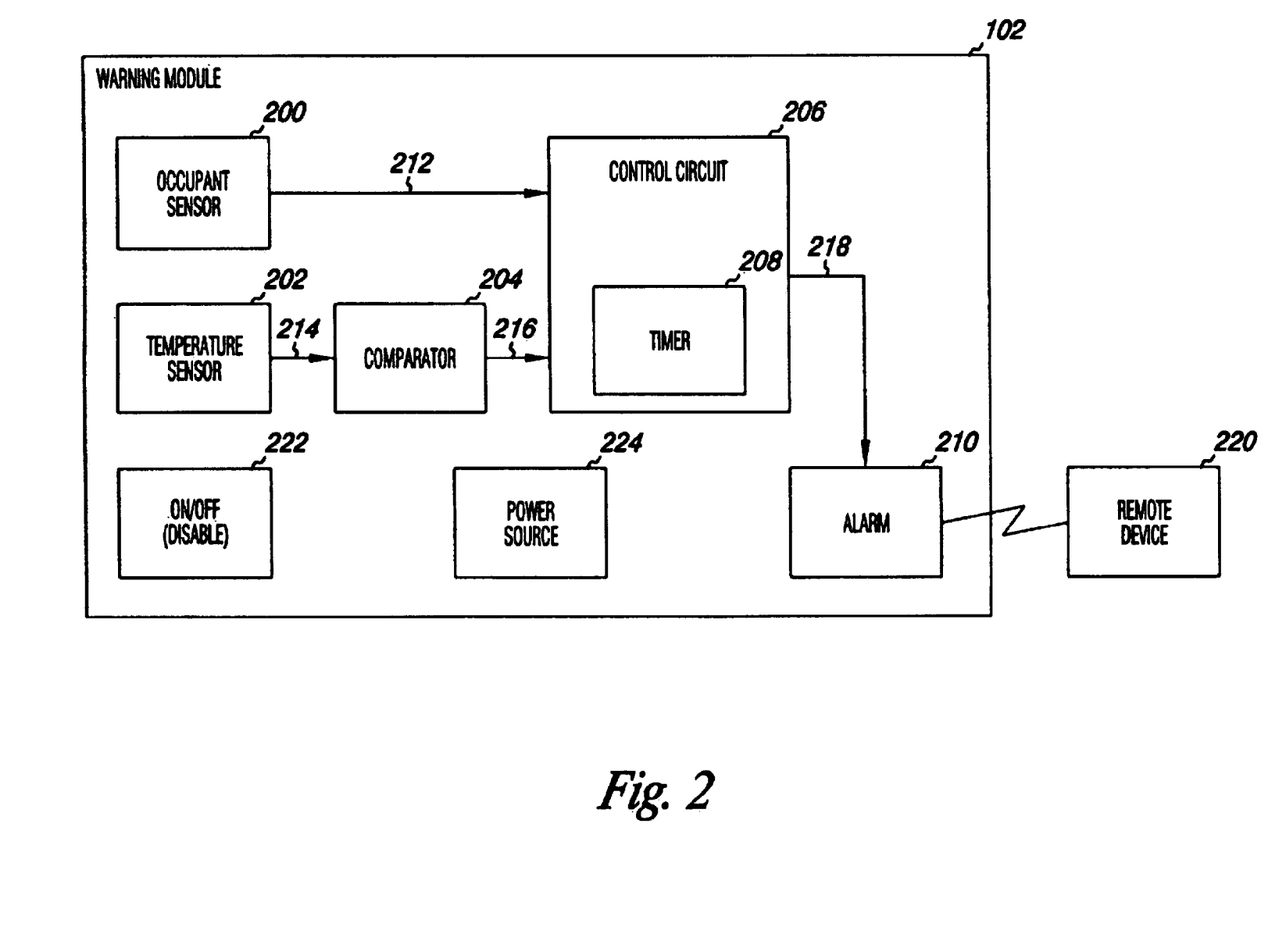
FIG. 2 is a block diagram illustrating generally an example of portions of a warning module.

FIG. 2 is a block diagram illustrating generally an example of portions of warning module 102. In this example, warning module 102 includes: an occupant sensor 200; temperature sensor 202; a comparator 204; a logic circuit, state machine, microprocessor, or other control circuit 206; a timer circuit 208; and an alarm 210. Occupant sensor 200 detects whether a child is present in seat 100, and provides a resulting output indicator, at node/bus 212, to control circuit 206. Temperature sensor 202 (for example, a thermistor, thermocouple, semiconductor circuit, etc.) detects ambient temperature in the vehicle and provides, at node/bus 214, a signal indicative thereof to comparator 204. Comparator 204 compares the received temperature signal at node/bus 214 to one or both of a high temperature threshold value and/or a low temperature threshold value defining an acceptable temperature range between these temperature extreme thresholds. Comparator 204 provides to control circuit 206, at node/bus 216, a signal indicating whether the ambient vehicle temperature is within or outside the acceptable temperature range. Control circuit 206 performs executable steps, or includes hardwired logic, to operate so that if seat 100 is occupied and the ambient vehicle temperature is outside the acceptable range, timer 208 is reset to initiate the subsequent measurement of time. If seat 100 is occupied and the ambient vehicle temperature remains outside the acceptable range for a predetermined period of time, logic or other control circuit 206 provides a signal, at node/bus 218, that a potentially dangerous alarm condition exists, and activates alarm 210.

In one example, alarm 210 first provides an audible and/or visual indication within the vehicle that a child has been exposed to temperature extremes for the predetermined period of time. In another example, alarm 210 includes a wireless communication device that wirelessly communicates the alarm condition to a remote device 220. Remote device 220 includes a portion that is mounted to the exterior of the vehicle (e.g., under the hood in the engine compartment of the vehicle), or even in the interior of the vehicle. In response to the alarm condition received from alarm 210, remote device 220 provides an audible and/or visual alarm, or is otherwise configured to attract the attention of any nearby people outside the vehicle.

In another example, alarm 210 includes a wireless telephony device that communicates through a wireless telephone network to a remote device 220. In this example, remote device 220 may be a mobile or other telephone number of a caregiver, a "911" operator, an emergency monitoring service provider, or a prioritized preprogrammed list of several such or other telephone numbers to be dialed in the event of such an emergency. Where alarm 210 also includes an indicator within the vehicle, such actions summoning emergency personnel or other caregivers may be suppressed by the driver, upon hearing the interior alarm indicator, disabling subsequent alarm actions by pressing switch 222.

In a further example, alarm 210 includes a connection or wireless transmitter coupled to an onboard vehicle navigation system serving as remote device 220. In this example, the vehicle navigation system is capable of wirelessly communicating with a further remote user, emergency personnel, or emergency monitoring service. Alarm 210 provides an alert signal to the vehicle navigation system, which is, in turn, communicated to the remote user or service. Examples of suitable vehicle navigation systems are commercially available. Some vehicle navigation systems also include a global positioning system (GPS) for further communicating the location of the vehicle to the remote user or service so that emergency personnel can be summoned. Alternatively, such functionality of the vehicle navigation system is incorporated within alarm 210 itself, which communicates alert and location information to a remote device 220, where the remote device 220 is a remote user or monitoring service.

In a further example, warning module 102 includes a device for disabling the alarm 210, such as on/off switch 222. In yet another example, warning module 102 includes a power source 224, such as a rechargeable or other battery, a cigarette lighter or other adapter to receiver power from the vehicle electrical system, or any other suitable energy source.

Figure 3:
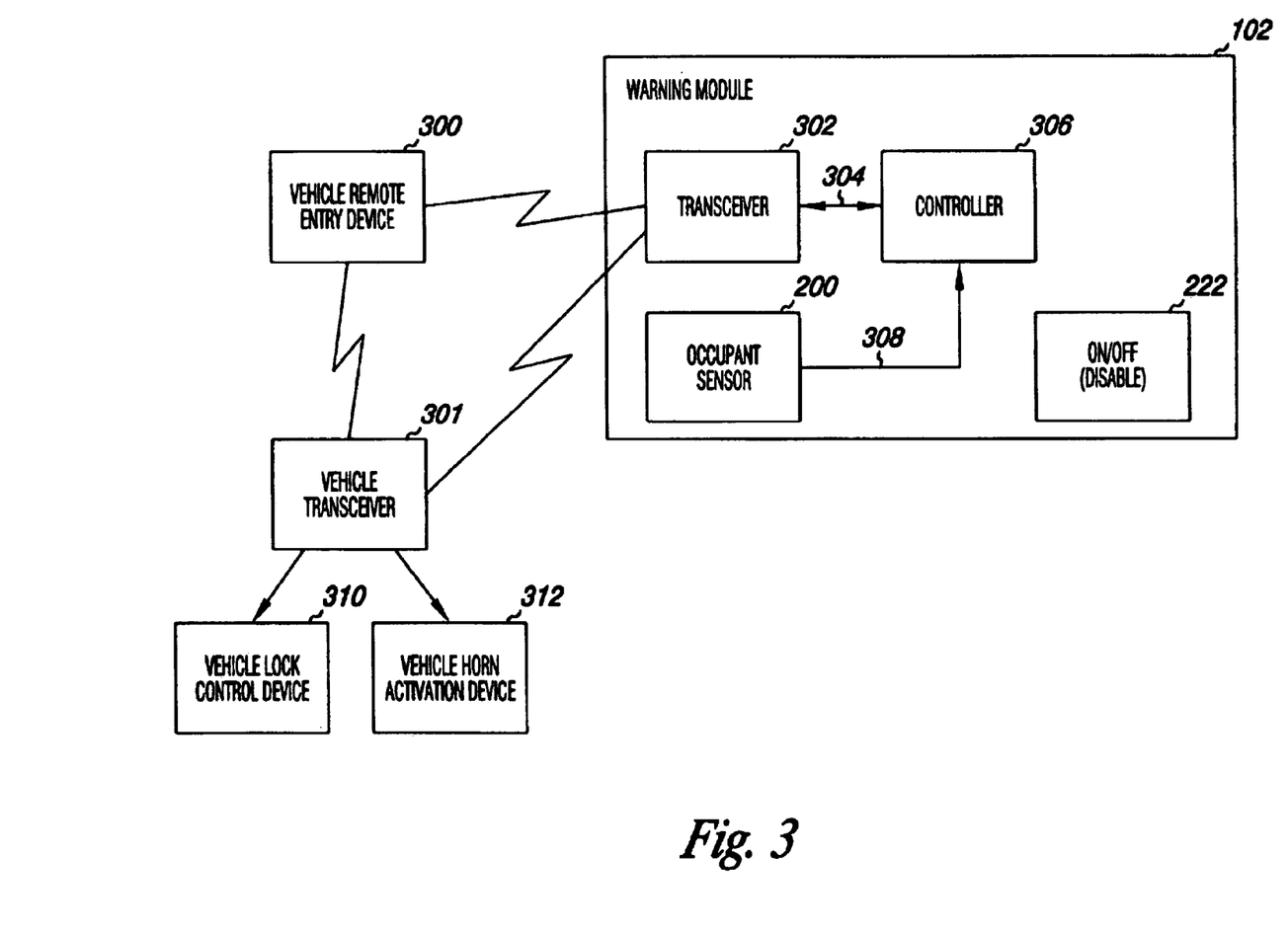
FIG. 3 is a block diagram illustrating generally another example of portions of a warning module.

FIG. 3 is a block diagram illustrating generally another example of portions of a warning module 102. This example includes a vehicle remote entry device 300 (sometimes referred to as a keyless entry device) for locking and unlocking vehicle doors by wirelessly communicating information to a companion vehicle transceiver 301 at the vehicle. Vehicle transceiver 301 is coupled to a vehicle door lock control actuation device 310 and a vehicle horn actuation device 312.

In this example, warning module 102 includes a transceiver 302 that configured to receive the wireless signal from remote entry device 300 that triggers locking of the vehicle doors. Transceiver 302 communicates, via node/bus 304, a signal to control circuit 306 that indicates that the vehicle doors are being locked. Occupant sensor 200 is also coupled, via node/bus 308, to controller 306 to communicate a signal indicating whether seat 100 is occupied. If controller 306 detects that the car doors are being locked and seat 100 is still occupied, it communicates a signal to vehicle receiver or transceiver 301 to activate the vehicle horn actuation device 312 to sound the vehicle horn or other alarm. This alerts the nearby user of the remote entry device that a child is still in the car seat. The horn tone could be the same, or a different tone, from that typically activated upon locking the car doors, or upon pressing the "alarm" button on the remote entry device. If the horn is normally sounded upon locking the car doors, for example, then the alarm condition signaled by warning module 102 to vehicle transceiver 301 may include a longer audible alarm or other distinguishing feature to alert the user that a child is still in the car seat. In a further example, the signal from transceiver 302 to vehicle transceiver 301 optionally also triggers a responsive signal, from vehicle transceiver 301 to vehicle lock control device 310, that unlocks one or more vehicle doors or prevents such doors from being locked. This further example could be temporarily disabled by the user, for that particular instance of locking the vehicle doors, by applying disable switch 222 to override such a function. In a further example, transceiver 302 is also capable of receiving a similar signal from a transceiver coupled to a power door lock mechanism at (rather than remote from) the vehicle.

In a further example, remote device 220 of FIG. 2 is implemented as the illustrated vehicle transceiver 301 and horn actuation device 312 illustrated in FIG. 3. Other combinations of FIGS. 2 and 3, and/or other figures in this document are also possible.

Figure 4:
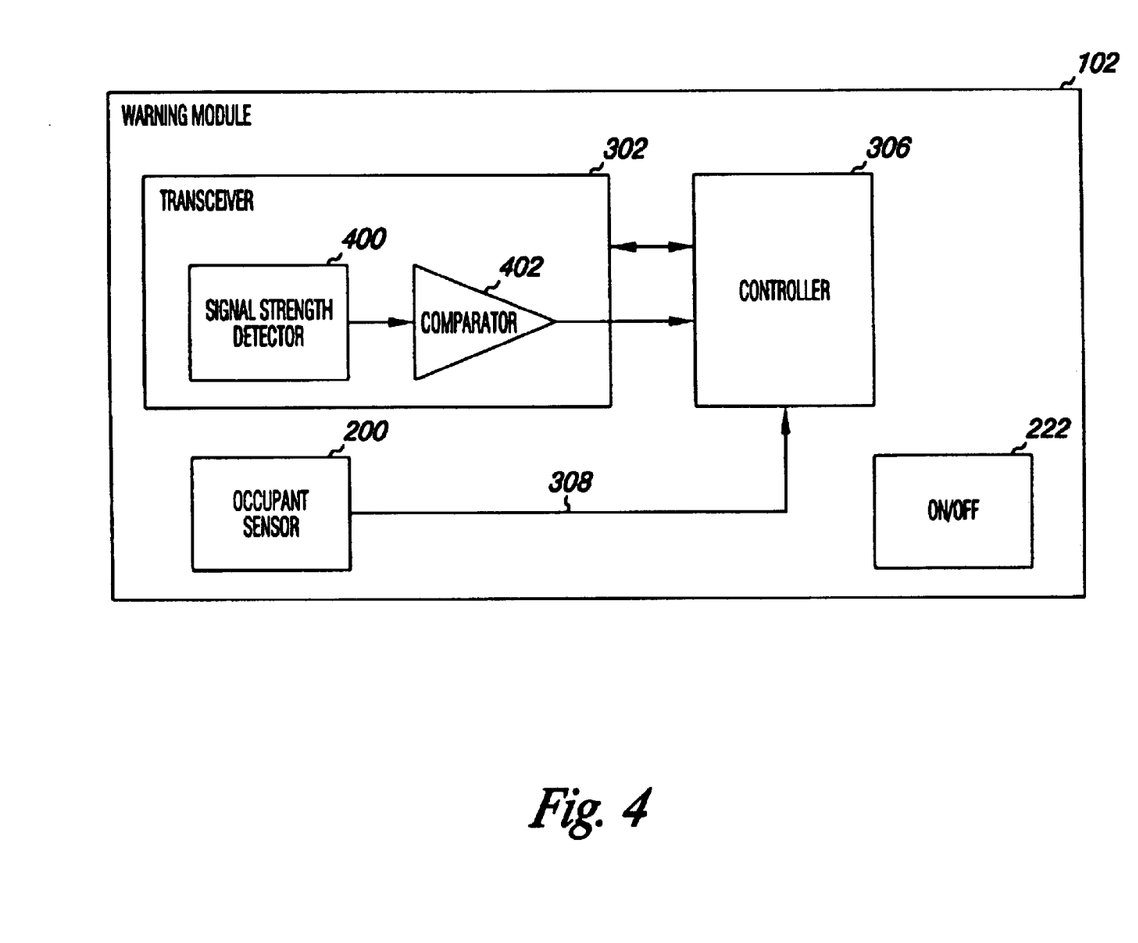
FIG. 4 is a block diagram illustrating generally an example of portions of an example transceiver in a warning module.

In a further example, as illustrated in the block diagram of FIG. 4, transceiver 302 includes a signal strength detector circuit 400 for detecting the strength of the wireless signal provided by remote entry device 300. In this example, the received signal strength is used to determine the distance between the vehicle driver (carrying the remote entry device 300) and the vehicle itself. In one example, this distance is determined by receiving the output from signal strength detector 400 at a comparator 402, comparing the signal strength to a predetermined value, and outputting a responsive signal that indicates whether the signal strength has fallen below the predetermined value and, therefore, the driver is determined to have gone beyond the allowable distance from the vehicle with the child still in seat 100.

In this example, controller 306 operates such that transceiver 302 alerts vehicle receiver or transceiver 301 if the occupant sensor 200 indicates that a child remains in seat 100, and the physical distance of remote entry device 300 (and, presumably, that of the driver carrying it) exceeds the predetermined threshold value (e.g., 25 feet), as determined from the received signal strength. Vehicle transceiver 301, in turn, provides a signal to vehicle horn actuation device 312 for sounding the vehicle horn and optionally provides a signal to vehicle lock control device 310 for unlocking (and/or opening, in some vehicles which have such remote entry device activated automatic door-opening capability) one or more of the vehicle doors.

In a further example, in which the alarm is triggered by detecting the signal from remote entry device 300 to lock the vehicle doors when the child is in seat 100, activation of the alarm also dependent upon the received signal strength. In this example, if the received signal strength exceeds the predetermined threshold value, the act of locking the vehicle doors using the remote entry device 300 does not trigger the alarm. This suppresses the alarm from being sounded when remote entry device 300 is used to lock the doors from within the vehicle, or when the remote entry device is in the immediate vicinity of the vehicle.

Figure 5:
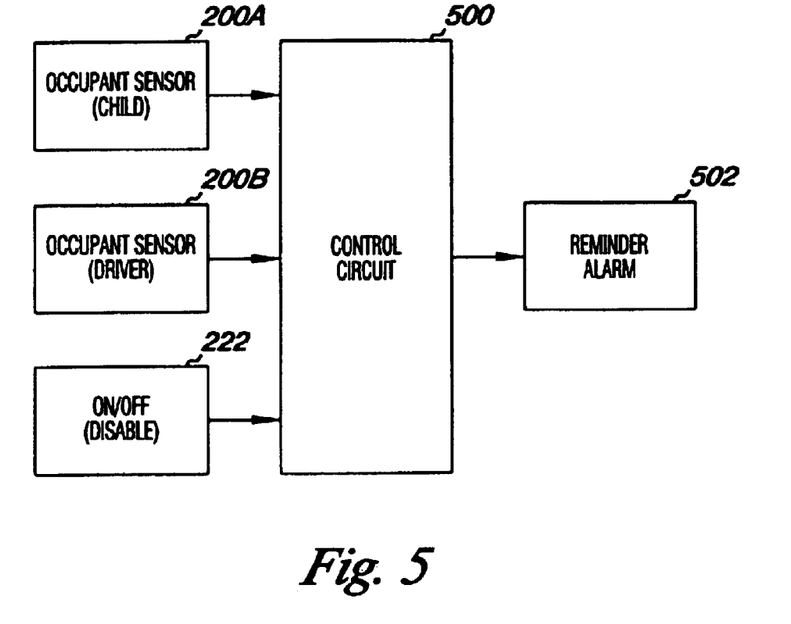
FIG. 5 is a block diagram illustrating generally an example of portions of a warning module including a driver occupant sensor.

FIG. 5 is a block diagram illustrating generally an alternative example of portions of warning module 102. This example includes a child occupant sensor 200A and a driver occupant sensor 200B. Driver occupant sensor 200B is located at the driver seat of the vehicle. Each of child occupant sensor 200A and driver occupant sensor 200B are electrically connected or wirelessly coupled to other portions of warning module 102, such as a logic circuit, state machine, digital microprocessor or microsequencer, or other suitable controller circuit 500. Control circuit 500 is configured so that when child occupant sensor 200A indicates that a child is in seat 100, and driver occupant sensor 200B indicates that the driver gets up from the driver seat, a responsive signal is provided by control circuit 500 to reminder alarm 502. Reminder alarm 502 is located within and/or outside the vehicle, and provides a visual indication, an audible tone, and/or a voice message reminding the driver to remove the child from seat 100. A disabling switch is electrically or wirelessly coupled to control circuit 500 to suppress the reminder alarm 502 (such as if the child is sleeping and the driver does not want to wake the child). In order to direct the driver's conscious attention to the child in such a situation, in one example, the disabling switch is located on seat 100 in close proximity to the child, but also within reach of the driver from the front driver seat.

Figure 6:
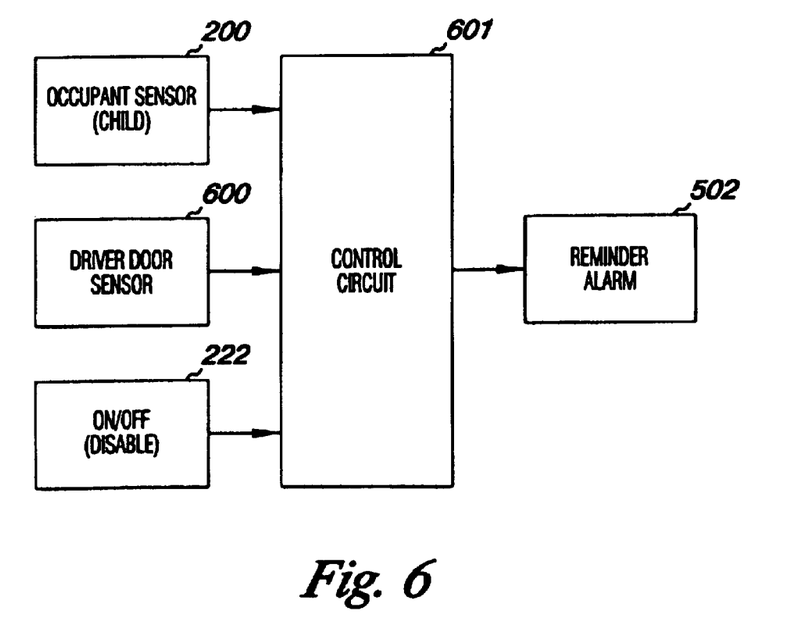
FIG. 6 is a block diagram illustrating generally an example of portions of a warning module including a driver door sensor.

FIG. 6 is a block diagram illustrating generally an alternative example portion of a warning module 102. This example includes a child occupant sensor 200, and a driver door sensor 600, each communicating responsive signals to control circuit 601. In this example, control circuit 601 is configured so that when child occupant sensor 200 indicates that a child is in seat 100, and driver door sensor 600 indicates that the driver door has been opened, a responsive signal is provided by control circuit 601 to reminder alarm 502. Reminder alarm 502 is located within and/or outside the vehicle, and provides a visual indication, an audible tone, and/or a voice message reminding the driver to remove the child from seat 100. A disabling switch is electrically or wirelessly coupled to the control circuit 601 to suppress the reminder alarm 502 (such as if the child is sleeping and the driver does not want to wake the child). In order to bring the driver's conscious attention to the child in such a situation, in one example, the disabling switch is located on seat 100 in close proximity to the child, but also within reach of the driver from the front driver seat.

In various embodiments, occupant sensor 200 includes a weight or pressure sensor device in or attached to seat 100. Examples of weight and pressure sensors for vehicle seats are found in U.S. Pat. No. 6,243,643; U.S. Pat. No. 6,259,167; U.S. Pat. No. 6,223,606; U.S. Pat. No. 6,070,115; U.S. Pat. No. 6,024,378; U.S. Pat. No. 5,971,432; U.S. Pa. No. 5,848,661; U.S. Pat. No. 5,640,145; and U.S. Pat. No. 5,821,633, each of which is incorporated by reference in its entirety. Some of these sensors include pressure sensing switches located in the seat cushion, under the seat cushion, in the headrest, and/or in or under a backrest cushion. For infants, the weight to be determined is, for example, but not by way of limitation, in the range of about 1 to about 30 pounds, in the range of about 2 to about 25 pounds, or in the range of about 5 to about 20 pounds. The weight of the infant may be greater than or less than these values, as the infant may not be positioned such that her or his full body weight registers on or with the sensor.

Another example of occupant sensor 200 includes a visual or other electromagnetic radiation detector, such as a camera. Examples are found in U.S. Pat. No. 6,198,998; U.S. Pat. No. 5,983,147; U.S. Pat. No. 6,005,958, each of which is incorporated by reference in its entirety. The camera may be mounted in a number of different positions in the vehicle, such as over the front wind shield or on the roof. See, e.g., U.S. Pat. No. 6,014,602, which is incorporated by reference herein in its entirety. Another example occupant sensor 200 includes an ultrasound transmitter and/or receiver. See, e.g., U.S. Pat. No. 6,029,105, which is incorporated by reference herein in its entirety. Another example of occupant sensor 200 includes an electromagnetic field sensor. See, e.g., U.S. Pat. No. 5,605,348, which is incorporated by reference herein in its entirety. Other types of transmitter and/or receiver sensor(s) are also included. See, e.g., U.S. Pat. No. 5,802,479, which is incorporated herein by reference in its entirety. Moreover, a combination of the above sensors or other sensors can be used to implement occupant sensor 200. See, e.g., U.S. Pat. No. 6,026,340, which discusses a combination infrared and ultrasound sensor as a multi-sensor and a combination thermal and acoustic sensor, and which is incorporated herein by reference in its entirety.

Examples of remote entry device 300, vehicle transceiver 301, and associated vehicle components to which vehicle transceiver 301 interfaces, are discussed in U.S. Pat. No. 5,600,302, U.S. Pat. No. 6,236,333, and U.S. Pat. No. 6,259,362, each of which is incorporated by reference herein in its entirety.

While the above examples have treated the particular problem of leaving a child behind in an infant seat, it is understood that these techniques are equally applicable to sense and warn whether any occupant (e.g., driver or other passengers) has been left behind in a vehicle seat, which need not be a child seat. Moreover, the terms infant seat and child seat in this document include child booster seats for older children. Furthermore, the infant, child, or booster seats referred to herein need not be limited to removable seats, but also include such seats that are built in to the vehicle itself, including such seats that are also capable of seating an adult.

It is to be understood that the above description is intended to be illustrative, and not restrictive. For example, the above-discussed embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A warning system for detecting a child left in a car seat in a vehicle, the system comprising:
   a removable child car seat;
   a child occupant sensor, associated with the car seat, the child occupant sensor including an input to detect a child in the child car seat, and including an output providing a signal representative of whether a child is present in the child car seat;
   a temperature sensor, associated with the car seat, the temperature sensor including an input to detect an ambient vehicle temperature, and including an output to provide a signal responsive to the ambient vehicle temperature; and
   an alarm control circuit, associated with the car seat, coupled to the child occupant sensor output and the temperature sensor output, the alarm control circuit coupled to an alarm configured to provide, without requiring information about a vehicle ignition state, a warning using information about whether the child is present in the child car seat and the ambient vehicle temperature is outside an acceptable range.

2. The system of claim 1, further including:
   a comparator circuit, coupled to the output of the temperature sensor, and including at least one of high and low temperature thresholds, the comparator having an output to provide a signal indicating whether the ambient vehicle temperature is outside the acceptable range;
   wherein the control circuit is coupled to the output of the comparator and the output of the child occupant sensor, the control circuit including a timer to determine whether the child has been in the seat for a predetermined period of time at a temperature outside the acceptable range, and an output to provide a responsive alarm activation signal; and wherein the alarm is coupled to the output of the control circuit to provide an alarm responsive to the alarm activation signal.

3. The system of claim 2, in which the alarm is remote from the control circuit and communicatively coupled thereto.

4. The system of claim 1, in which the alarm includes at least one of:

a wireless telephony device;

a global positioning system (GPS) device; and an actuator configured to actuate at least one of unlocking and opening a door of the vehicle.

5. The system of claim 1, in which the alarm is communicatively coupled to a vehicle remote entry device to receive a door-locking signal, and in which the alarm is coupled to the child occupant sensor, and wherein the alarm is configured to provide a warning using information from the child occupant sensor indicating that the child seat is occupied and the door-locking signal indicating that the door is being locked.

6. The system of claim 5, in which the alarm includes a signal strength detector configured to detect a distance between a portion of the vehicle and the remote entry device, and wherein the alarm is configured to use the distance in providing a responsive warning.

7. A warning system for detecting a child left in a child car seat in a vehicle, the system comprising:

a removable child car seat;

a child occupant sensor associated with the removable child car seat, the child occupant sensor including an input to detect a child in the child car seat, and including an output providing a signal representative of whether a child is present in the child car seat; and a remote entry device, communicatively coupled to the child occupant sensor, the remote entry device configured to trigger a warning indicating that the child has been left behind in the vehicle using information about whether the child is present in the child car seat, the information obtained from the child occupant sensor associated with the removable car seat and without requiring information from an occupancy sensor that is an integral component of the vehicle or from an ignition circuit that is an integral component of the vehicle.

8. The system of claim 7, in which the remote entry device includes a user input device configured to lock a door of the vehicle, and in which the remote entry device is configured to trigger a warning if the child is present in the child car seat when the user input device is activated to lock the door of the vehicle.

9. The system of claim 7, in which the remote entry device is configured to trigger a warning using information about whether the child is present in the child car seat and information about a distance between the remote entry device and the vehicle.

10. The system of claim 7, in which the alarm includes at least one of:

a wireless telephony device;

a global positioning system (GPS) device; and an actuator configured to actuate at least one of unlocking and opening a door of the vehicle.

11. The system of claim 7 in which the alarm includes a signal strength detector configured to detect a distance between a portion of the vehicle and the remote entry device, and wherein the alarm is configured to use the distance in providing a responsive warning.

12. A warning system for detecting a child left in a child car seat in a vehicle, the system comprising:

a removable child car seat;

a child occupant sensor, associated with the removable child car seat, the child occupant sensor including an input to detect a child in the child car seat, and including an output providing a signal representative of whether a child is present in the child car seat;

a driver occupant sensor, communicatively coupled to the removable child car seat, the driver occupant sensor including an output providing a signal representative of whether a driver is present in the driver's, seat without requiring driver occupancy information obtained from a driver occupancy sensor that is an integral component of the vehicle; and an alarm, communicatively coupled to the child occupant sensor and the driver occupant sensor, the alarm configured to provide a warning using information about whether the child is present in the child car seat and the driver is no longer present in the driver's seat.

13. A method comprising:

detecting whether a child is present in a removable child car seat in a vehicle;

detecting an ambient vehicle temperature of a vehicle using a temperature sensor that is associated with the removable child car seat; and providing an indication of whether a child is present in the child car seat at an ambient temperature outside a predetermined range using an alarm control circuit that is associated with the removable child car seat, wherein the indication is provided without requiring information about an ignition state of the vehicle.

14. The method of claim 13, in which the providing the indication includes providing an indication of whether a child is present in the child car seat at an ambient temperature outside a predetermined range for a time period that exceeds a predetermined duration.

15. The method of claim 13, further including wirelessly communicating the indication to a remote location.

16. The method of claim 13, further including at least one of unlocking and opening a door of the vehicle using the indication.

17. A method comprising:

detecting whether a child is present in a child car seat in a vehicle, the detecting using an occupancy sensor of the child car seat and without using an occupancy sensor that is an integral component of the vehicle;

detecting a locking of a vehicle door using a keyless remote entry device; and providing an indication of whether a child is present in the child car seat upon the detecting the locking of the vehicle door using the keyless remote entry device and without requiring information from an occupancy sensor that is an integral component of the vehicle or from an ignition circuit that is an integral component of the vehicle.

18. The method of claim 17 further including detecting a distance between the remote entry device and the vehicle, and in which the providing the indication includes also using the distance in determining whether to provide the indication.

19. The method of claim 17, further including wirelessly communicating the indication to a remote location.

20. The method of claim 17, further including at least one of unlocking and opening a door of the vehicle using the indication.

21. A method comprising:
- detecting whether a child is present in a removable child car seat in a vehicle the detecting using an occupancy sensor of the child car seat and without using an occupancy sensor that is an integral component of the vehicle;
- detecting at least one of (a) a driver leaving the driver's seat; and (b) a driver's door being opened, the detecting performed without requiring driver occupancy or door status information from an integral component of the vehicle; and
- providing a warning indication if a child is present in the child car seat and at least one of: (a) a driver has self the driver's seat; and (b) a driver's door has been opened.

22. The method of claim 21, further including wirelessly communicating the indication to a remote location.

23. The method of claim 21, further including at least one of unlocking and opening at lease one door of the vehicle using the indication.

* * * * *